(12) United States Patent
Mao

(10) Patent No.: US 9,651,196 B1
(45) Date of Patent: May 16, 2017

(54) MULTI-FUNCTIONAL SELF-TIMER LEVER

(71) Applicant: Lianhua Mao, Xiamen (CN)

(72) Inventor: Lianhua Mao, Xiamen (CN)

( * ) Notice: Subject to any disclaimer, the term of this patent is extended or adjusted under 35 U.S.C. 154(b) by 32 days.

(21) Appl. No.: 14/918,582

(22) Filed: Oct. 21, 2015

(51) Int. Cl.
| *G03B 17/56* | (2006.01) |
| *F16M 13/06* | (2006.01) |
| *F16M 13/04* | (2006.01) |
| *A45F 5/10* | (2006.01) |
| *F16M 11/24* | (2006.01) |
| *F16M 11/28* | (2006.01) |

(52) U.S. Cl.
CPC ............... *F16M 13/06* (2013.01); *A45F 5/10* (2013.01); *F16M 11/245* (2013.01); *F16M 11/28* (2013.01); *F16M 13/04* (2013.01); *G03B 17/561* (2013.01); *A45F 2200/0516* (2013.01); *A45F 2200/0533* (2013.01)

(58) Field of Classification Search
CPC ........ F16M 11/28; F16M 11/24; F16M 11/32; F16M 11/00; F16M 13/06; F16M 11/245; F16M 13/04; A45F 5/10; A45F 2200/0516; A45F 2200/0533; G03B 17/561; Y10T 16/551; Y10T 16/5515; Y10T 16/5518; E05D 11/06
USPC ..... 294/139; 248/176.1, 177.1, 178.1, 179.1, 248/180.1, 181.1
See application file for complete search history.

(56) References Cited

U.S. PATENT DOCUMENTS

| 212,405 | A | * | 2/1879 | Saegmuller | ............ | F16M 11/12 |
| | | | | | | 248/180.1 |
| 2,940,709 | A | * | 6/1960 | Neuwirth | ............... | F16M 11/28 |
| | | | | | | 248/168 |
| 4,671,479 | A | * | 6/1987 | Johnson | ................. | F16M 11/16 |
| | | | | | | 248/173 |
| 5,676,411 | A | * | 10/1997 | Kwok | .................. | A01K 23/005 |
| | | | | | | 294/1.5 |
| 6,283,421 | B1 | * | 9/2001 | Eason | ...................... | G10G 5/00 |
| | | | | | | 248/170 |
| 7,684,694 | B2 | * | 3/2010 | Fromm | .................. | F16M 11/14 |
| | | | | | | 396/376 |
| 2002/0083554 | A1 | * | 7/2002 | Lu | ........................... | E05D 11/06 |
| | | | | | | 16/340 |
| 2008/0117328 | A1 | * | 5/2008 | Daoud | .................... | F16M 11/10 |
| | | | | | | 348/373 |

(Continued)

FOREIGN PATENT DOCUMENTS

| AT | WO 2007093191 | A1 | * | 8/2007 | .......... | E05D 11/084 |
| TW | DE 202014008938 | U1 | * | 1/2015 | .......... | G03B 17/561 |
| TW | DE 202015004549 | U1 | * | 10/2015 | .......... | F16M 11/041 |

*Primary Examiner* — Gabriela Puig
(74) *Attorney, Agent, or Firm* — Leong C. Lei

(57) ABSTRACT

A multi-functional self-timer lever includes a support device coupled to a casing pipe attachable to a lower part of a telescopic rod. The support device includes a pivot seat fixed to the casing pipe, three feet of which tops are coupled pivotally to the pivot seat, and a positioning mechanism for limiting the expansion angles of the feet. Such a structure provides a tripod function in a most compact way by configuring the feet capable of being expanded relatively to the casing pipe and collapsed into one body relatively to the contour of the casing pipe directly on the casing pipe operated in coordination with the telescopic rod. Therefore, the entire structure is compact, fast and convenient in expansion and collapse, and small in volume so as to be convenient for carry.

6 Claims, 5 Drawing Sheets

(56) References Cited

U.S. PATENT DOCUMENTS

| | | | |
|---|---|---|---|
| 2013/0094196 A1* | 4/2013 | Wessel | F21L 4/04 |
| | | | 362/198 |
| 2014/0003802 A1* | 1/2014 | Fromm | G03B 17/561 |
| | | | 396/428 |
| 2014/0339841 A1* | 11/2014 | Vieira Caeiro Dias Antunes | F16M 11/123 |
| | | | 294/139 |
| 2015/0366391 A1* | 12/2015 | Peek | A47G 33/008 |
| | | | 248/150 |
| 2016/0091134 A1* | 3/2016 | May | F16M 11/28 |
| | | | 248/404 |
| 2016/0091139 A1* | 3/2016 | Levine | F16M 13/04 |
| | | | 294/139 |

\* cited by examiner

MULTI-FUNCTIONAL SELF-TIMER LEVER

TECHNICAL FIELD OF THE INVENTION

The present invention relates to a self-timer lever structure, and more particular to a multi-functional self-timer lever, capable of being not only hand-held but placed at a fixed point.

DESCRIPTION OF THE PRIOR ART

Self-timer levers are very popular now, capable of being stretched at will out a distance ranged from 20 cm to 120 cm. A user only needs to fix a cellular phone or instamatic to a telescopic rod, and can then carry out a multi-angle selfie through a remote controller. Most of self-timer levers can be stretched out in a range between 24 and 54 cm, and some of them 65 and 135 cm; the choice of the stretch length can be determined depending on different requirements, but a portable, retractable structure allows a self-timer lever to be more suitable to be packed in a travel rucksack. Currently, a user must use one hand to hold a self-timer lever to carry out selfie such that the user's hand strength requires higher. If the self-timer lever is operated in coordination with a large weight of camera, the operation will be very difficult and the user's hand is easy to shake, needing an additionally equipped tripod to solve the above problems. But, the tripod not only takes up space, carries inconveniently, but is time and labor consumptive upon the collapse and expansion thereof.

SUMMARY OF THE INVENTION

The object of the present invention is to provide a multi-functional self-timer lever, capable of not only achieving a handheld operation, but adapting to a fixed-position operation, while has a compact structure, small collapse volume so as to be convenient for carry.

To achieve the object mentioned above, the present invention proposes a multi-functional self-timer lever, including a telescopic rod, a retaining stand configured on the upper end of the telescopic rod and a casing pipe configured on the lower part of the telescopic rod, wherein a support device is configured on the casing pipe, and includes a pivot seat fixed to the casing pipe, three feet coupled pivotally to the pivot seat, and a positioning mechanisms adapted to limit the expansion angles of the feet, The pivot seat includes a upper cover and a pivot base covered by the upper cover, where pivot slots are configured on the pivot base, the top of the foot being coupled pivotally to the pivot slot through a pin.

The positioning mechanism allows a pivot hole in the pivot slot to be set to a double-sector structure adapted to limit the rotational angle of the pin.

The positioning mechanism is formed with a block surface on the upper part of the pivot slot.

The foot is a curved piece with a shape corresponding to the external surface shape of the casing pipe, and a pivot heat is formed on the upper part of the curved piece.

The curved piece is set to be on third of the surface curve of the casing pipe.

A lock mechanism adapted to tie the three feet together after collapse is configured on the lower part of one of the three feet.

The lock mechanism is a retaining ring coupled pivotally to one of the three feet, and a groove for the engagement with the retaining ring is respectively formed on the lower parts of the other two feet so as to achieve the collapse and positioning of the three feet.

Therefore, the present invention achieves the tripod function in a most compact way by configuring the feet capable of being expanded relatively to the casing pipe and collapsed into one body relatively to the contour of the casing pipe directly on the casing pipe operated in coordination with the telescopic rod. Therefore, the entire structure of the present invention is compact, fast and convenient in expansion and collapse, and small in volume so as to be convenient for carry.

DETAILED DESCRIPTION OF THE PREFERRED EMBODIMENTS

Figure 1:
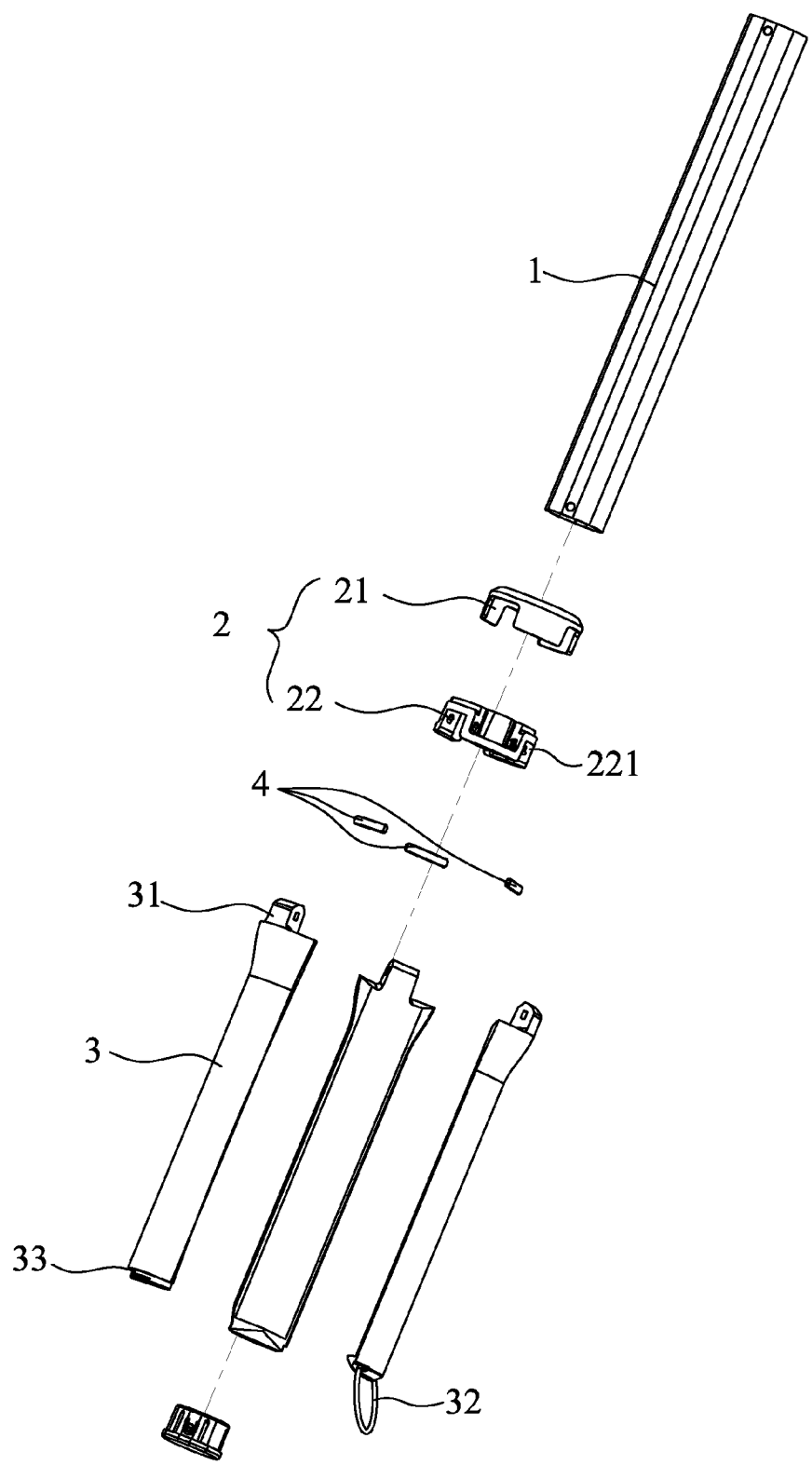
FIG. 1 is an exploded view of a support structure of the present invention in a non-operating state.
Figure 1A:
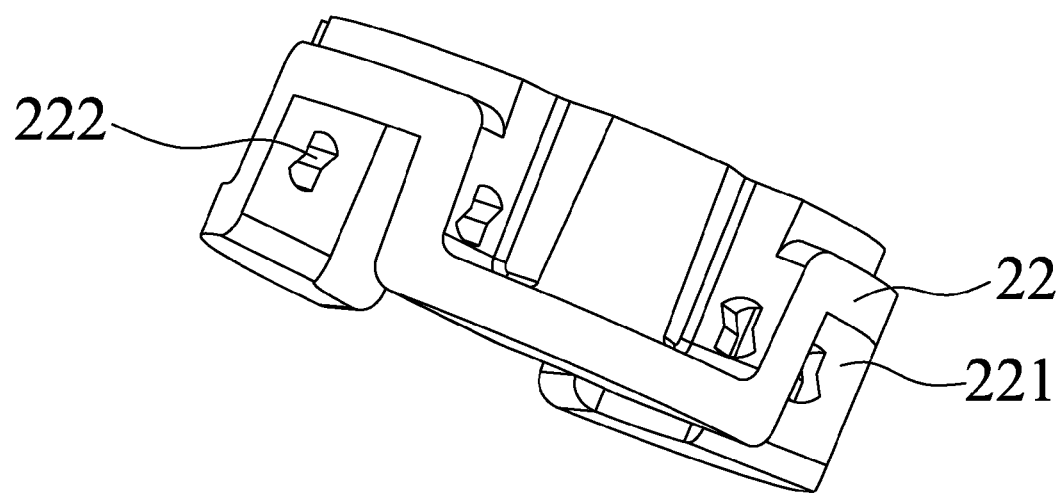
FIG. 1A is an enlarged view of a pivot base of the present invention shown in FIG. 1.
Figure 2:
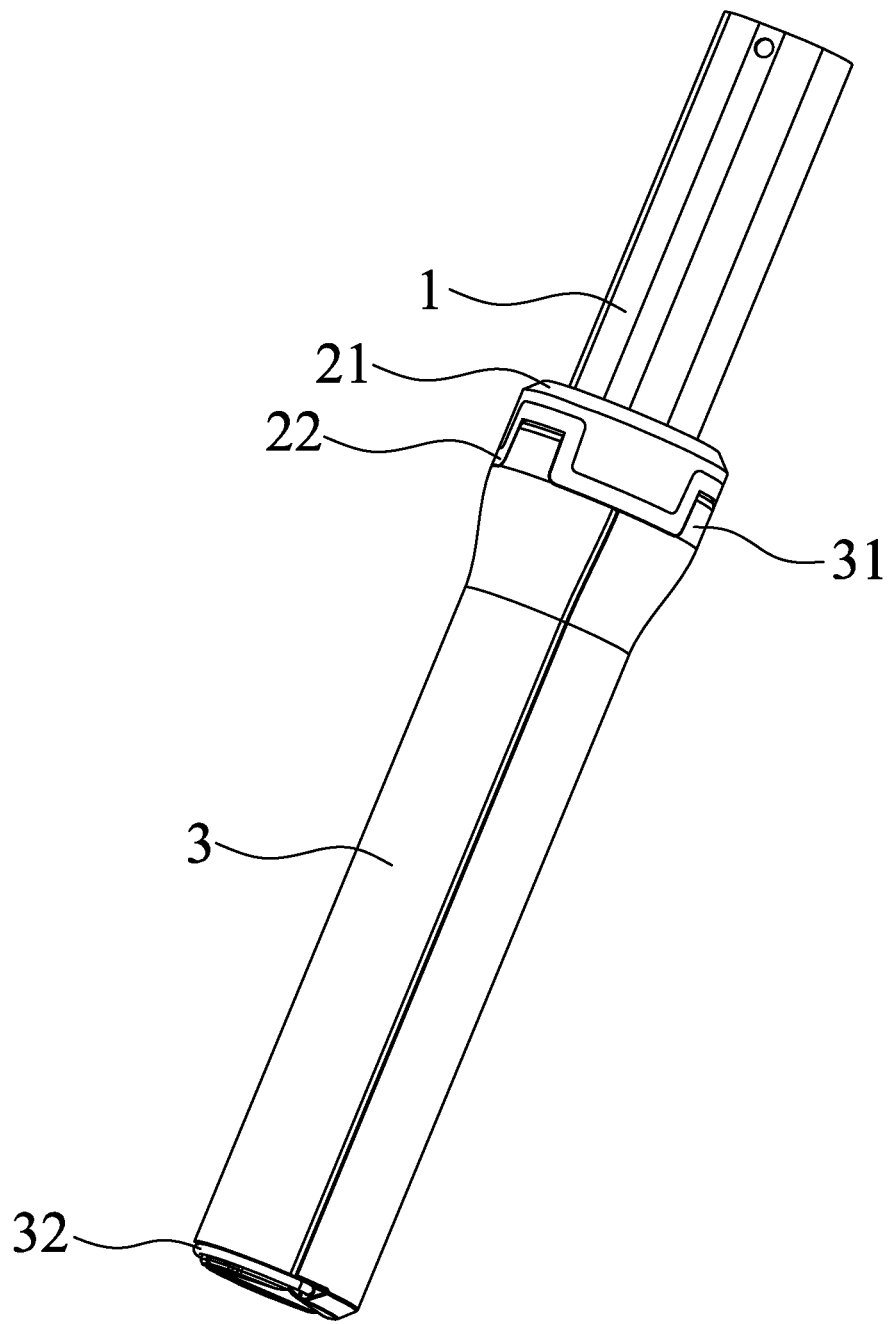
FIG. 2 is a schematically perspective view of the support structure of the present invention in a non-operating state.
Figure 3:
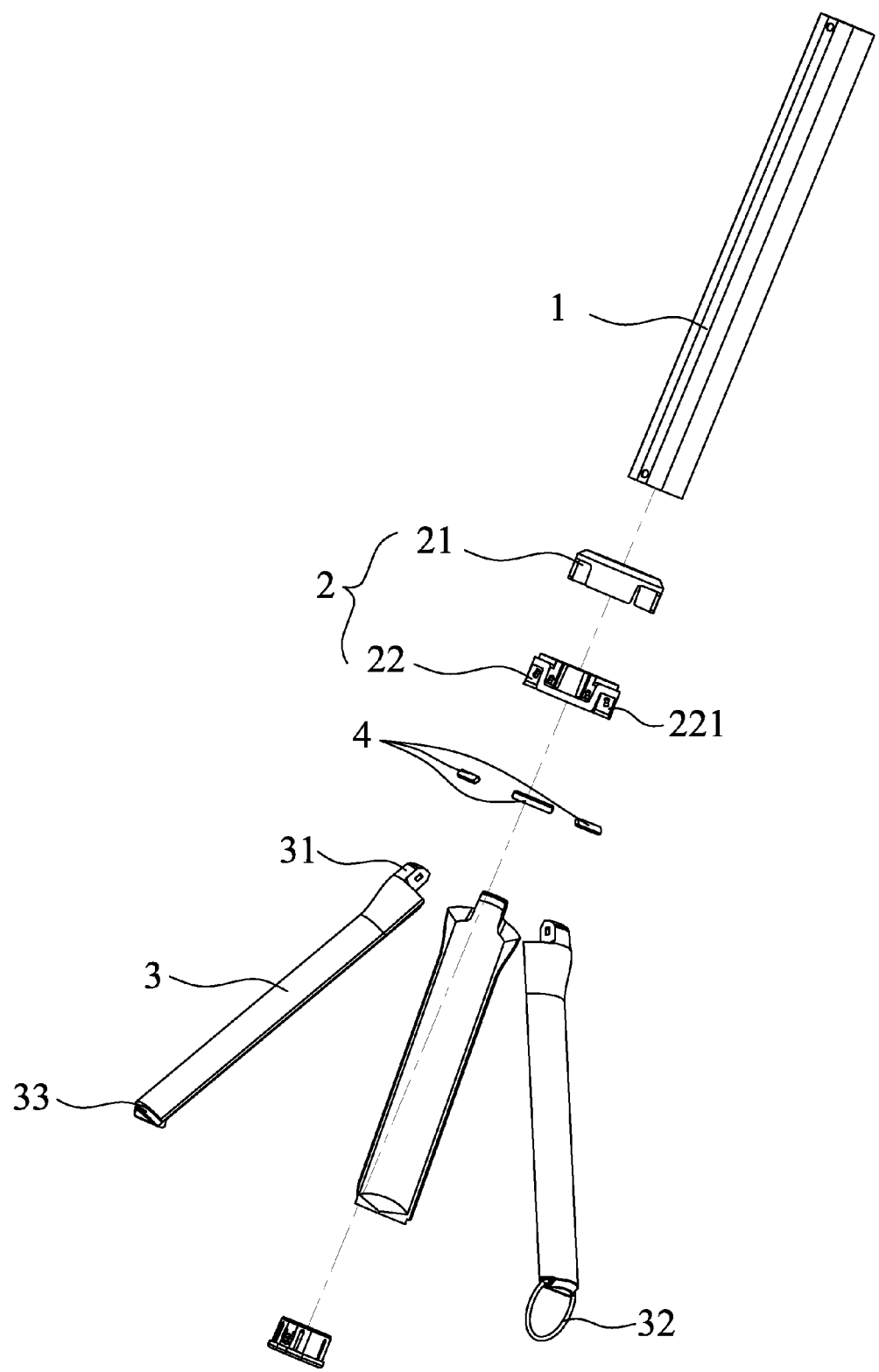
FIG. 3 is an exploded view of a support structure of the present invention in an operating state.
Figure 4:
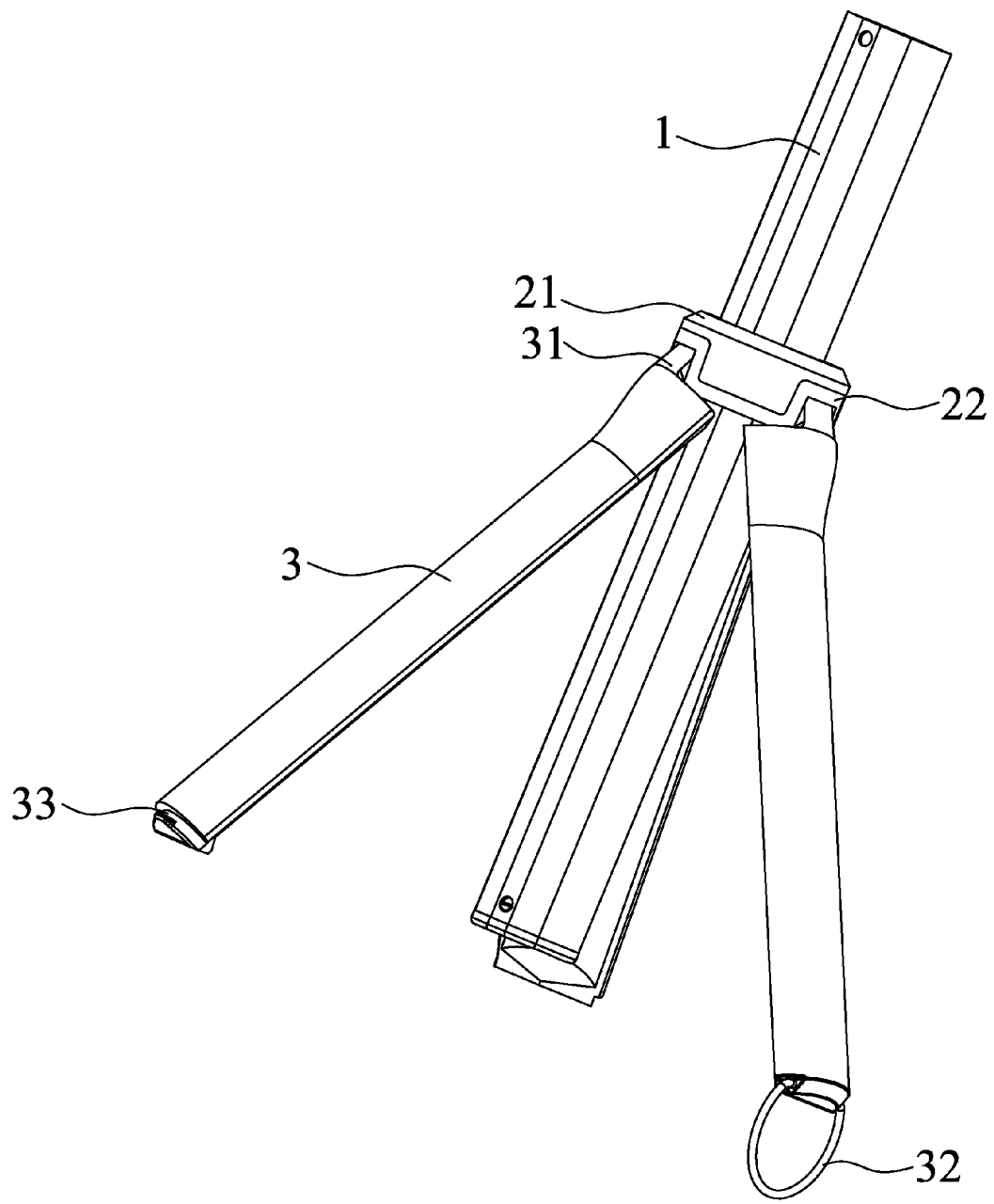
FIG. 4 is a schematically perspective view of the support structure of the present invention in an operating state.

Referring to FIGS. 1 to 4, a self-timer lever of the present invention includes a telescopic rod, which is operated in coordination with a retaining stand on the upper end of thereof and a casing pipe 1 configured on the lower part of the telescopic rod. The key points of the present invention are described hereinafter.

A support device is configured on the casing pipe 1 on the lower part of the telescopic rod; the support device includes a pivot seat 2 fixed to the casing pipe 1, three feet 3 coupled pivotally to the pivot seat 2 through the top parts thereof, and positioning mechanisms adapted to limit the expansion angles of the three feet 3.

Pivot slots 221 to which the feet 3 are coupled pivotally are configured on the pivot seat 2. The pivot seat 2 of the present embodiment includes a upper cover 21 and a pivot base 22 covered by the upper cover 21, where the pivot slots 221 are configured on the pivot base 22, the top parts of the feet 3 being coupled pivotally to the pivot slots 221 through pins 4. In the embodiment, the positioning mechanism allows the pivot hole 222 in the pivot slot 221 to be set to a double-sector structure, i.e. a pivot hole formed by butting two sectors to form a structure smaller in the middle and larger at the two ends, as such, the pivot hole 222 of the double-sector structure only allows the pin 4 to turn in an angle range limited by the pivot hole 222, thereby limiting the expansion angle of the foot 3 relative to the casing pipe 1. But, the positioning mechanism is not limited the structure mentioned above, it still can adopt the structure in which the upper part of the pivot slot 221 is formed into a block surface, which also can limit the expansion angle of the foot 3.

The foot 3 is a curved piece with a surface corresponding to the external surface of the casing pipe 1; each curved piece may be set to one third of the surface curve of the casing pipe 1 such that the three curved pieces can be clasped together to form a complete contour. The upper part of the curved piece is formed into a pivot head 31, which can be extended into the pivot slot 221 of the pivot base 22 and coupled pivotally to the pivot base 22.

Furthermore, a lock mechanism adapted to tie the tree feet 3 together after being collapsed may further be configured on the lower part of one of the three feet 3; the lock mechanism may be a retaining ring 32 coupled pivotally to one of the three feet 3, and a groove 33 for the engagement with the retaining ring 32 is respectively formed on the lower parts of the other two feet 3, thereby collapsing and positioning the tree feet 3.

When the three feet 3 abut on the casing pipe 1 and are retained by the lock mechanism, the support in such a state can carry out the normal handheld operation of the self-timer lever, while does not take up two much space, thereby achieving normal collapse and carry.

Furthermore, when the self-timer lever wants to be fixed, a user only needs to release the lock mechanism, and then pulls the three feet 3 open, thereby achieving the tripod function of the support so as to meet the multipurpose of the self-timer lever.

To sum up, the present invention achieves the tripod function in a most compact way by configuring the feet capable of being expanded relatively to the casing pipe and collapsed into one body relatively to the contour of the casing pipe directly on the casing pipe operated in coordination with the telescopic rod. Therefore, the entire structure of the present invention is compact, fast and convenient in expansion and collapse, and small in volume so as to be convenient for carry.

Additional advantages and modifications will readily occur to those skilled in the art. Therefore, the invention in its broader aspects is not limited to the specific details and representative embodiments shown and described herein. Accordingly, various modifications may be made without departing from the claims or scope of the general inventive concept as defined by the appended claims and their equivalents.

I claim:

1. A multi-functional self-timer lever, comprising a casing pipe adapted to be mounted to a lower part of a telescopic rod and comprising a support device that is coupled to said casing pipe, wherein said support device comprises: a pivot seat, which is fixed to said casing pipe; three feet, tops thereof being coupled pivotally to said pivot seat such that said feet are rotatable with respect to said pivot seat between an expansion position and a collapse position; and a positioning mechanism, which limits an expansion angle of said three feet in the expansion position, a lock mechanism being mounted to said feet and comprising a retaining ring coupled pivotally to a first one of said three feet and a groove formed in a second one and a third one of said three feet for engagement with said retaining ring in the collapse position so as to retain said three feet in the collapse position.

2. The self-timer lever according to claim 1, wherein said pivot seat comprises an upper cover and a pivot base covered by said upper cover, and pivot slots are configured on said pivot base, the tops of said feet being coupled pivotally and respectively to said pivot slots through a pin associated with each of said three feet.

3. The self-timer lever according to claim 2, wherein said positioning mechanism allows a pivot hole in each said pivot slot to be set to a double-sector structure to limit a rotational angle of said pin.

4. The self-timer lever according to claim 2, wherein said positioning mechanism is formed with a block surface on an upper part of said pivot slot.

5. The self-timer lever according to claim 1, wherein said feet are each a curved piece with a shape corresponding to an outer surface shape of said casing pipe.

6. The self-timer lever according to claim 5, wherein said curved piece is set to one third of a surface curve of said casing pipe.

* * * * *